(12) United States Patent
Feregrino-Quezada et al.

(10) Patent No.: US 8,501,258 B1
(45) Date of Patent: Aug. 6, 2013

(54) METHOD FOR PREPARING MILK-BASED BEVERAGES

(76) Inventors: Jose Antonio Feregrino-Quezada, Aguascalientes (MX); Juan Carlos Feregrino-Quezada, Aguascalientes (MX)

( * ) Notice: Subject to any disclaimer, the term of this patent is extended or adjusted under 35 U.S.C. 154(b) by 0 days.

(21) Appl. No.: 13/220,611

(22) Filed: Aug. 29, 2011

Related U.S. Application Data

(63) Continuation-in-part of application No. 11/872,462, filed on Oct. 15, 2007.

(60) Provisional application No. 60/829,382, filed on Oct. 13, 2006.

(51) Int. Cl.
*A23C 3/00* (2006.01)

(52) U.S. Cl.
USPC .......... 426/330.3; 426/590; 426/72; 426/330; 426/599

(58) Field of Classification Search
USPC .............. 426/72, 330.3, 590, 599, 330, 330.5
See application file for complete search history.

(56) References Cited

U.S. PATENT DOCUMENTS

| | | |
|---|---|---|
| 3,625,702 A | 12/1971 | Exler |
| 3,764,710 A | 10/1973 | Inagami |
| 4,061,792 A | 12/1977 | Inagami |
| 4,078,092 A | 3/1978 | Nishiyama |
| 4,212,893 A | 7/1980 | Takahata |
| 4,298,625 A | 11/1981 | Cillario |
| 4,497,834 A | 2/1985 | Barta |
| 4,565,702 A | 1/1986 | Morley |
| 4,619,831 A | 10/1986 | Sharma |
| 4,673,578 A | 6/1987 | Becker |
| 4,676,988 A | 6/1987 | Efstathiou |
| 4,759,940 A | 7/1988 | Cattaneo |
| 5,202,145 A | 4/1993 | Wisler |
| 5,320,859 A | 6/1994 | Namdari |
| 5,520,946 A | 5/1996 | Chablaix |
| 5,648,112 A | 7/1997 | Yang |
| 5,849,350 A | 12/1998 | Ashourian |
| 5,879,737 A | 3/1999 | Ashourian |
| 5,895,648 A | 4/1999 | Cavaliere-Vesely |

(Continued)

FOREIGN PATENT DOCUMENTS

| | | |
|---|---|---|
| EP | 0083327 A1 | 7/1983 |
| WO | 2007021205 A1 | 2/2007 |

OTHER PUBLICATIONS

Office Action in U.S. Appl. No. 12/614,775 Dated Jul. 12, 2010.

(Continued)

*Primary Examiner* — Humera Sheikh
*Assistant Examiner* — Hong T Yoo
(74) *Attorney, Agent, or Firm* — Stephen W. Melvin

(57) ABSTRACT

The present invention provides a method for preparing storable products that contain most of the nutritious elements contained in milk. Embodiments combine the different milk elements into liquid products of different looks and tastes that can be stored without refrigeration. All of the products could additionally be supplemented with probiotic components that can be activated upon consumption, allowing storage for extended periods of time without refrigeration. Moreover, because they are mainly composed of highly digestible milk protein, these products can be used to encapsulate different therapeutics and vitamin supplements for patients under aggressive therapeutic regimens such as: immunosuppressants, high level antibiotics, chemotherapy. Due to their balance of carbohydrates, protein and lipids, the products can be beneficial for individuals suffering from diabetes or from lactose intolerance. Finally, the products can also work as an effective tool to maintain weight balance.

13 Claims, 3 Drawing Sheets

U.S. PATENT DOCUMENTS

| | | |
|---|---|---|
| 6,106,874 A | 8/2000 | Liebrecht |
| 6,117,478 A | 9/2000 | Dubberke |
| 6,171,633 B1 | 1/2001 | Dulebohn |
| 6,221,419 B1 | 4/2001 | Gerrish |
| 6,287,623 B1 | 9/2001 | Nakayama |
| 6,423,354 B1 | 7/2002 | Monte |
| 6,620,450 B1 | 9/2003 | Davis |
| 6,652,896 B2 | 11/2003 | Young |
| 6,667,068 B2 | 12/2003 | Smith |
| 6,761,920 B1 | 7/2004 | Kaplan |
| 6,866,877 B2 | 3/2005 | Clark |
| 7,083,816 B2 | 8/2006 | Souppe |
| 7,214,370 B2 | 5/2007 | Naidu |
| 7,247,333 B2 | 7/2007 | Ashourian |
| 7,501,143 B2 | 3/2009 | Bhaskar |
| 7,794,770 B2 | 9/2010 | Sherwood |
| 7,799,363 B2 | 9/2010 | Sherwood |
| 7,842,326 B2 | 11/2010 | Sherwood |
| 2002/0168448 A1 | 11/2002 | Mody |
| 2004/0161422 A1 | 8/2004 | Ranganathan |
| 2004/0166203 A1 | 8/2004 | Gautam |
| 2004/0185161 A1 | 9/2004 | Ashourian |
| 2004/0223956 A1 | 11/2004 | Naidu |
| 2008/0317928 A1 | 12/2008 | Towler |

OTHER PUBLICATIONS

Response to Office Action in U.S. Appl. No. 12/614,775, Dated Jan. 12, 2011.

Rule 132 Affidavit for U.S. Appl. Nos. 11/872,462 and 12/614,775, Dated Jan. 21, 2011.

Office Action in Application No. 12/614,775 Dated Feb. 3, 2011.

METHOD FOR PREPARING MILK-BASED BEVERAGES

RELATED APPLICATIONS

This application is a continuation-in-part of application Ser. No. 11/872,462, filed on Oct. 15, 2007, which claims priority to provisional application 60/829,382, filed on Oct. 13, 2006, all of which are incorporated herein by reference.

FIELD OF THE INVENTION

The present invention generally relates to a method for preparing a family of products from milk or milk derived substances that can be stored without refrigeration. More specifically, the present invention relates to methods of combining the principal components of milk to produce solids such as bars and liquids such as functional drinks and diet drinks.

BACKGROUND

Dairy products such as liquid milk are high in protein and can form an important part of a nutritious diet. Unfortunately, many people do not generally consume liquid milk in sufficient quantities for a number of reasons. There has been some effort to prepare milk-based products in solid form which are more convenient to consume.

U.S. Pat. No. 4,497,834 discloses a process for preparing a dairy-based product. This process involves condensing fatted or defatted milk to essentially the solids and moisture content desired in the final product, reducing the lactose content to below about 15 percent, and then cooking the mixture to produce, upon cooling, a gel-like material. This process is only able to obtain relatively low moisture levels by significantly increasing the fat/protein ratios. Such high fat/protein ratios result in a less desirable high-fat product, thereby significantly reducing the nutritional characteristics of the product.

U.S. Pat. No. 4,298,625 discloses a low moisture foam consisting of an oil-in-water emulsion prepared from edible fat, milk proteins, water, and optionally added sugars. Such high fat/protein ratios result in a less desirable high-fat product, thereby significantly reducing the nutritional characteristics of the product.

U.S. Pat. No. 6,667,068 discloses a method of producing a solid milk product that retains most of the nutritional value of milk but with a high fat/protein ratio.

It would be desirable, therefore, to produce solid products from milk having low moisture levels as well as low fat/protein ratios.

With regard to drinks, although milk-based products containing fruit flavors are known, commercial products containing juice generally only have only approximately 5% to 10% milk. Also, many of these products have a chalky taste and feel in the consumer's mouth.

U.S. Pat. No. 3,625,702 discloses the preparation of sour milk drinks which are naturally or synthetically soured. U.S. Pat. No. 4,676,988 discloses a method by which milk and juice are subjected to cation and anion exchange and then homogenized and optionally pasteurized or sterilized and/or carbonated to prepare a juice drink containing some milk. U.S. Pat. Nos. 3,764,710 and 4,061,792 disclose the formation of milk/juice beverages by removing pectin substances and tannins from fruits or fruit extracts. U.S. Pat. No. 5,648,112 discloses the use of stabilizers and processing steps to stabilize a beverage containing milk and a food acid, preferably fruit juices.

U.S. Pat. No. 4,212,893 discloses the use of whole milk and indicates that the locust bean gum coats the milk fat solids to prevent aggregation and increase stability. U.S. Pat. No. 4,078,092 discloses the use of carboxymethyl cellulose (CMC) to form a stable, un-coagulated milk/apple juice drink.

U.S. Pat. No. 6,171,633 discloses a milk-based drink containing milk, fruit or vegetable juice, gum-based stabilizers. U.S. Pat. No. 5,202,145 discloses an aqueous shelf-stable beverage product including water and milk solids, but not reaching the level of milk proteins and nutrients contained in the original milk.

U.S. Pat. No. 6,866,877 discloses a method to produce a carbonated milk beverage but that is supplemented with soy protein and dry powdered milk. U.S. Pat. No. 7,247,333 discloses a homogenized blend of milk and fruit juice but the composition of original milk nutrients (mostly protein and calcium) is reduced considerably from the original milk.

While there are several non-fermented milk products containing fruit juice, they have been unsuccessful in achieving incorporation of a large amount of milk in a stable juice product that has desirable flavor and has suitable stability for delivery to the consumer in a common retail market delivery environment typical in the United States and other western countries.

It would be desirable, therefore, to provide a stable milk product which contains most of the original milk nutrients and proteins and a good amount of fruit juice and flavors to attract the average consumer. It is further desirable to provide such a milk product in a non refrigerated storable format to compete with soft drinks and to be flavorful and without the chalky taste of most such products.

BRIEF SUMMARY OF THE INVENTION

The present invention provides a method for preparing storable products that contain most of the nutritious elements contained in milk. Embodiments combine the different milk elements into liquid and solid products of different looks and tastes that can be stored without refrigeration. All of the products could additionally be supplemented with probiotic components that can be activated upon consumption, allowing storage for extended periods of time without refrigeration. Moreover, because they are mainly composed of highly digestible milk protein, these products can be used to encapsulate different therapeutics and vitamin supplements for patients under aggressive therapeutic regimens such as: immunosuppressants, high level antibiotics, chemotherapy. Due to their balance of carbohydrates, protein and lipids, the products can be beneficial for individuals suffering from diabetes or from lactose intolerance. Finally, the products can also work as an effective tool to maintain weight balance.

DETAILED DESCRIPTION

Figure 1:
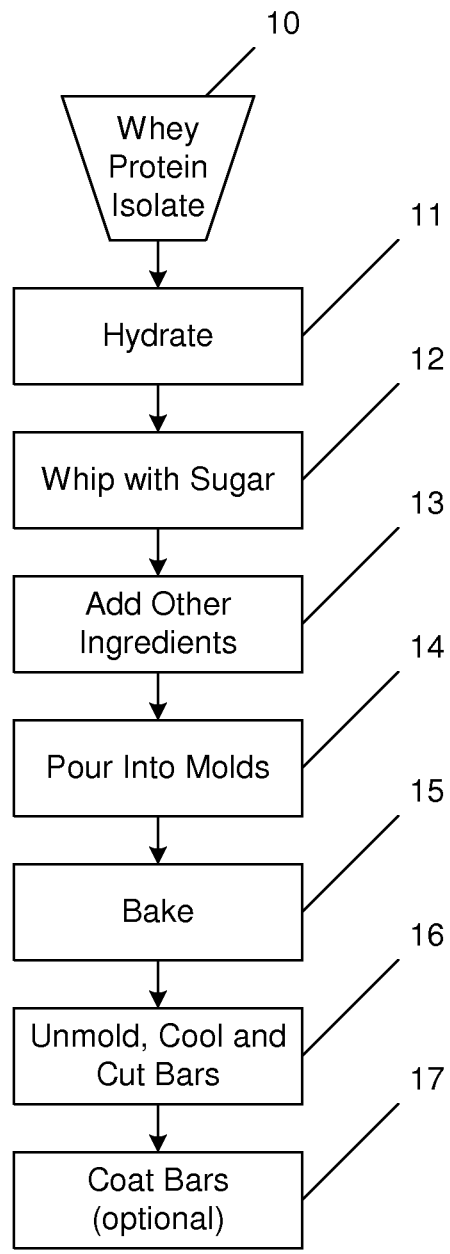
FIG. 1 illustrates an embodiment of the present invention.

The fast pace of the modern world has created a convenience ready to wrap and eat as well as a fast food industry that caters to the needs of working individuals and a society constantly under stress and time pressures. At the same time modern economy has promoted fast globalization and the penetration of foreign dietary costumes into previously closed societies. These two parallel influences have triggered an epidemic of obesity and concurrent diseases (diabetes, cardiovascular disease, cancer, etc.) in both developed and developing worlds. On the other hand, while the first world is suffering some of the consequences of plenty, some large populations in the developing world are suffering from hunger and malnutrition. It safe to assume that the ready to wrap and eat and fast food industry will continue to grow and that together with globalization, diseases like diabetes will reach pandemic proportions in many countries. Therefore, there is room for new types of food products that can help alleviate some of these problems. These new food products should have the following properties:

1. New food products should be highly nutritious and well balanced in the composition of carbohydrates, proteins, and lipids. This is essential to be able to provide a balanced caloric intake for healthy and diseased individuals alike.

2. New food products should provide a highly nutritious form of easily digestible proteins.

3. New food products should be able to be stored without refrigeration to serve as a nutritional supplement in the third world.

4. In order to compete with the fast food industry, new food products should be presented as a family of snack products with compelling taste.

5. Ideally new food products should also function as nutraceuticals, providing benefits to a diseased population that consumes them.

Embodiments of the present invention address these needs by creating solid products and beverages from cow's milk. Cow's milk has been a traditional staple of the human diet for many centuries. Because of its close resemblance to human milk, cow's milk has been used by humans through their history to feed young and old alike. As a source of nutrition, milk as been utilized throughout the world in liquid or powder forms and has been converted into many derivative products such has cheese, yogurt, butter, etc. Milk proteins are now also becoming sources of supplemental protein and even dietary supplements for weight loss.

Embodiments of the present invention utilize the nutritional balance of milk to address some of the nutritional problems of modern society described above. These embodiments relate to the utilization of the different components of milk (proteins, carbohydrates) to produce off-the-shelf snacks that can provide not only balanced ready to wrap and eat food, but also products with a potential therapeutic effect. These products can be substitutes for the current sugar-laden snacks and soft drinks that school vending machines and cafeterias currently offer, and help prevent obesity. They can also be used to replace fattening fast food products for the general population. Furthermore, because they can be easily and continuously stored, they could be an excellent nutritional vehicle for undernourished populations in the third world, or they can be carried by armed forces in the field.

As nutraceuticals, products created by embodiments of the present invention can be used to deliver probiotics across the gastrointestinal tract. Since loss of nutrition, weight and energy are critical problems for cancer patients, these products composed of natural, easily digestible protein could be excellent dietary supplements when undergoing aggressive chemotherapy. Moreover, the availability of a highly nutritious source of easily digestible protein such has the ones contained in these products could be of important therapeutic effect to these patients. These products could be also be of great benefit to patients undergoing immunosuppressive treatment, high doses of antibiotics, or other aggressive treatments (e.g. AIDS) since they also suffer from problems of digestion and difficulty absorbing nutrients.

The incidence of obesity and diabetes world wide has risen dramatically in the last ten years. Obesity alone is the cause of hundreds of thousands of deaths world wide. Diabetes is a disease closely associated with obesity and has also been increasing in incidence worldwide at an alarming rate. The incidence of type 2 diabetes in the United States has doubled in the last 30 years.

Major contributors to the obesity epidemic are soft drinks and other sweetened beverages. For most of evolution humans have consumed milk after birth and water through life. When people drink any sweetened beverage their total calorie consumption rises dramatically. Although historically people have been drinking fruit juices, beer and milk, the proportion of calories coming from beverages was relatively low until the past 50 years, when soft drinks, in particular colas, began spreading worldwide.

It is estimated that putting sweeteners like corn syrup into beverages has added about 137 kcal to the average daily diet in the United States in the last 30 years. Over a year this amount of extra calories causes an average weight gain per person of more than 15 pounds. In developing countries consumption of soft drinks is caching up to that in the United States. For example the average person in Mexico now consumes more than 350 kcal of sweetened beverages a day. This is especially true in young adults, a population of historically low incidence of diabetes and obesity.

Mexico is one of the more striking examples of a developing country suffering from an obesity epidemic. In 1989 fewer than 10% of Mexicans were overweight. By the year 2006, 71% of women and 66% of Mexican men were overweight or obese. This puts Mexico at almost the same level as the United States. Furthermore, diabetes was almost nonexistent in Mexico 15 years ago, but today almost one in six individuals suffer from type 2 diabetes. The obesity rates in many developing countries now rival those in the United States and other developed nations. The shift from under nutrition to over nutrition has occurred in less than one generation (mostly in the last 15 years).

One solution to this problem is to substitute highly sweetened foods and beverages with well balanced foods. Consumed in moderation, the milk-derived drinks and solid products created by embodiments of the present invention provide a balanced mixture of carbohydrates, proteins, and lipids. The products could be beneficial to diabetics and could prevent obesity by replacing highly fattening snacks. A wide adoption of these products across the young student population could help slow down the current diabetes epidemic.

Embodiments of the present invention also involve a method of producing a beverage that can be a supplement for weight reduction. The milk-proteic drink created using an embodiment of the present invention, if supplemented with fiber, can be a dietary product that can replace sugar calories and fat and allow individuals to lose weight if consumed on a regular basis. Furthermore, several components of milk, for example conjugated linoleic acids (CLAs), have been shown to have anti-adipocyte effects. Although not yet fully studied, this CLA mechanism apparently arrests the differentiation of pre-adipocytes into adipocytes, therefore decreasing obesity. Additionally, the products that embodiments of the present invention describe are completely lactose free, allowing a large segment of the human population who are intolerant to milk to be able to consume milk-derived products.

Embodiments of the present invention also teach the use of milk-derived products to encapsulate or function as a carrier for other functional compounds, such as biologically active compounds, pharmaceuticals, live microorganism probiotics, peptides, and another nutraceutical components (this would be a nutraceutical within a nutraceutical since the encapsulation product acts itself as a nutraceutical).

There is scientific evidence that probiotics provided in food sources are more effective because the other components in the food help neutralize stomach acid, allowing the living probiotics to make it through the stomach intact. Milk is a well known stomach anti-acid and therefore these products can be excellent vehicles for probiotic delivery.

Another nutraceutical application of embodiments of the present invention is in the promotion and regeneration of bone density and bone growth. The current aging population, especially post menopausal women, suffer from a high incidence of osteoporoses, loss of bone density, and increase of bone fragility and life-threatening bone fractures. With its high content of calcium, these products can have a marked effect in decreasing the effect of aging and menopause on women's bones. They also provide a natural source of other minerals and vitamins to the population as a whole.

Another consequence of modernization has been the industrialization of agriculture and the large increase in the production of such crops as corn and soy beans. This in turn has made two derivatives from these crops inexpensive and easily available, namely: corn syrup and soy bean protein. Corn syrup has less sweetening potential than cane sugar, but because it so economical to produce, it has penetrated every conceivable food and drink product, adding to the diabetes pandemic. Soy protein has also been popularized as a "good" protein and has made its way into a large amount of foods. This has occurred in spite of much research showing the superiority of animal derived protein, such as milk.

When compared to milk protein, soy protein shows several disadvantages. Key among them is the binding of such key minerals like iron and zinc. This binding and removal of iron and zinc is especially critical for women since they suffer much more from anemia. On the other hand, soy protein can be especially harmful to pregnant women since a large proportion of them (60-70%) are anemic during pregnancy. Thus, soy not only lacks complete protein, zinc and iron, it contains compounds that block the absorption of protein, zinc and iron from other sources. Furthermore, soy foods increase the body's requirements for vitamin D and B12-both essential for normal growth and development.

Antithyroid substances found plentifully in soy foods inhibit thyroid function, leading to fatigue and mental problems. Phytoestrogens in soy can inhibit normal development and can cause reproductive and fertility problems later in life. Recent research implicates these phytoestrogens in the development of Alzheimer's' disease and dementia; as such they are "brain aging" substances. Modern soy products contain carcinogens and toxins formed during processing and all modern soy foods contain monosodium glutamate (MSG), which may cause neurological problems, including violent behavior. Additionally some studies suggest increased rates of infertility associated with consumption of soy protein.

As mentioned before, soy is a plant-borne hormone, and history has shown that adding hormones to the body can be unhealthy. It is entirely possible that such risks will be exponentially magnified as soy protein production shifts into high gear and people ingest more and more of the refined, plant-hormone based extracts. Companies are aggressively attempting to add soy's concentrated hormone-containing "protein isolate" under the guise of providing added nutrition to crackers, sport bars, cereals, and infant formulas.

These risks disappear when the products created by embodiments of the present invention are consumed by the same populations at risk. This, as stated previously, is due to their origin and the long adaptation of humans to consume milk over many centuries. These solid milk-based products can be created in flavorful and stable forms.

As stated above, milk is an excellent nutrient source and a staple of the global diet. However, milk consumption in the developed world is been declining, replaced by soft drinks and other artificial flavored drinks. Embodiments of the present invention combine most of the elements of milk to produce a fruit flavored beverage that could be flavorful enough to compete with soft drinks, and at the same time, retain most of the nutritional value of the original milk source. Thus there is a considerable advantage in combining milk and fruit juice or fruit flavors to form healthful beverage products.

Stability with respect to the coagulation of milk and other proteins is a significant problem for milk-based beverages. Taste is also a significant factor and open to different evaluations by consumers having a variety of different likes and dislikes. Juice-milk combinations in the past have produced beverages with an undesirable chalky taste. The milk-based beverages created by embodiments of the present inventions provide products that are have good stability, desirable taste and use both most of the milk nutrients and fruit juice flavors. Therefore the end product combines all healthy aspects of milk and an appealing fruit juice taste for the general public. These products combine all these elements: original milk nutrients, natural fruit juice flavor, stability, non refrigeration storage, and pleasant taste.

Some embodiments of the present invention utilize a collection of minerals including calcium known as a "milk calcium complex." It is understood in the art that a milk calcium complex refers to a specific collection of minerals including primarily calcium that are found in milk. In particular, milk includes a number of different minerals, including phosphorous, magnesium and potassium, as well as calcium, and the phrase "milk calcium complex" would be understood as a reference to a collection of minerals that approximates the collection found in milk.

An example of a milk calcium complex is the product with the commercial name "TruCal" produced by Glambia Nutritionals, Inc. Publicly available product information for TruCal is available at http://www.trucalmilkcalcium.com/ and is incorporated by reference. In the table below is the collection of some of the minerals found in TruCal with percentages.

TABLE 1

| Mineral | Percent |
| --- | --- |
| Calcium | 24% |
| Phosphorus | 12.5% |
| Magnesium | 1.5% |
| Potassium | 0.8% |
| Zinc | 0.008% |
| Copper | 0.0004% |

TruCal is a product that contains milk minerals including calcium and permits tailoring other foods products and supplements to have a mineral profile similar to milk. In a preferred embodiment, the milk calcium complex utilized is TruCal, however any similar product that approximates the mineral composition of milk could be utilized. In some embodiments, a milk calcium complex is utilized that contains calcium, phosphorus, magnesium and potassium. In some embodiments, a milk calcium complex is utilized that contains calcium, phosphorus, magnesium, potassium, zinc and copper.

FIG. 1 and Table 2 illustrates an embodiment of the present invention, which relates to the method of preparation and the composition of a milk bar with the nutritional characteristics of a glass of milk

TABLE 2

| Component | Weight (grams) | Percent | Batch (grams) |
|---|---|---|---|
| Sugar | 30.98 | 30.93% | 309.27 |
| Water | 22.45 | 22.41% | 224.12 |
| Whey Protein Isolate | 20.66 | 20.62% | 206.25 |
| High Density Crisp Rice | 17.55 | 17.52% | 175.20 |
| Milk Calcium Complex | 3.42 | 3.41% | 34.14 |
| Canola Oil | 3.11 | 3.10% | 31.05 |
| Potassium Citrate | 2.00 | 2.00% | 19.97 |
| TOTAL | 100.17 | 100.00% | 1000.00 |

In the embodiment disclosed above, there are two specific ingredients that contain some amount of protein: whey protein isolate and high density crisp rice. Whey protein isolate contains 90 to 95 percent protein by weight and high density crisp rice contains approximately 7% protein by weight. Using the percentages above, the resulting contribution from these ingredients into the final bar would be approximately 94% and 6% respectively. Thus, the only substantial source of protein in the bar is the whey protein isolate. In a preferred embodiment of the present invention greater than 90% of the total protein in the final product comes from why protein isolate.

In other words, whey is the only substantial source of protein but may not be the only source of protein because some of the other ingredients may contain a small portion of protein which is provided to the final product. However, in embodiments of the present invention the reason for having the other ingredients which may contain a small amount of protein is not to provide protein content but to provide flavor, biochemical, organoleptic or other functions.

The high density crisp rice of a preferred embodiment is used as a filler and integrating material that helps the mix to keep together as well to provide specific organoleptic characteristics as chewiness, moisture, bar density, softness or hardness and also helps the way flavor is perceived by the tongue papillae. High-density crisp rice is used because the size or kind of these crisps has a high volumetric weight or high density.

The lab procedure for preparing the bar is described below and summarized in FIG. 1. In step 11, whey protein isolate 10 is mixed with water to hydrate for approximately 15 minutes. In step 12, the hydrated why protein isolate is whipped at high speed, gradually adding sugar until soft peaks form, approximately 3-5 minutes.

In step 13, the remaining ingredients, including high-density crisp rice, milk calcium complex (to act as a calcium substitute), canola oil and potassium citrate are gently folded into the mix. In an alternative embodiment the high density crisp rice may be chocolate flavored. In step 14, the mix is placed into custom molds or on a baking sheet. In step 15, the mix is baked at approximately 200° F. until dry and set, approximately 40 minutes. In step 16, the bars are unmolded, cooled and cut into approximately 31-32 gram rectangles, a size of approximately 4½"×1½"×½". In a preferred embodiment, the yield of the resulting process (i.e. the percentage of final product from the starting total weight of all the ingredients) is approximately 90%.

In a preferred embodiment, the baking step results in a product with a low moisture content in a range of 5%-15% by weight and preferably in a range of 10%-13%.

The bars are optionally coated in some embodiments, as illustrated in step 17. In one embodiment, a dark sugar fee compound coating is melted and the bars are dipped into the melted coating and air dried to set. The bars are then wrapped and sealed. In one example, a batch of 8000 grams total weight can be processed by using 5571.56 grams of bars (69.64% by weight) and 2428.44 grams of coating (30.36% by weight). In this example a single bar weighing 45 grams of total weight would result from a 31.34 gram bar and 13.66 grams of coating.

Derived from a high solid concentration of protein and ingredients that might potentially present some bacteriological growth, embodiments of the present invention achieve an inner environment with a very low water activity index that inhibits bacteriological growth. In addition embodiments of the present invention use a coating as a seal to prevent the inner ingredients from absorbing moisture from the environment, achieving an extended shelf life of over eight months without refrigeration. In particular, bars prepared according to a preferred embodiment will remain suitable for consumption when stored at room temperature for at least 30 days and preferably for more than eight months.

Figure 2:
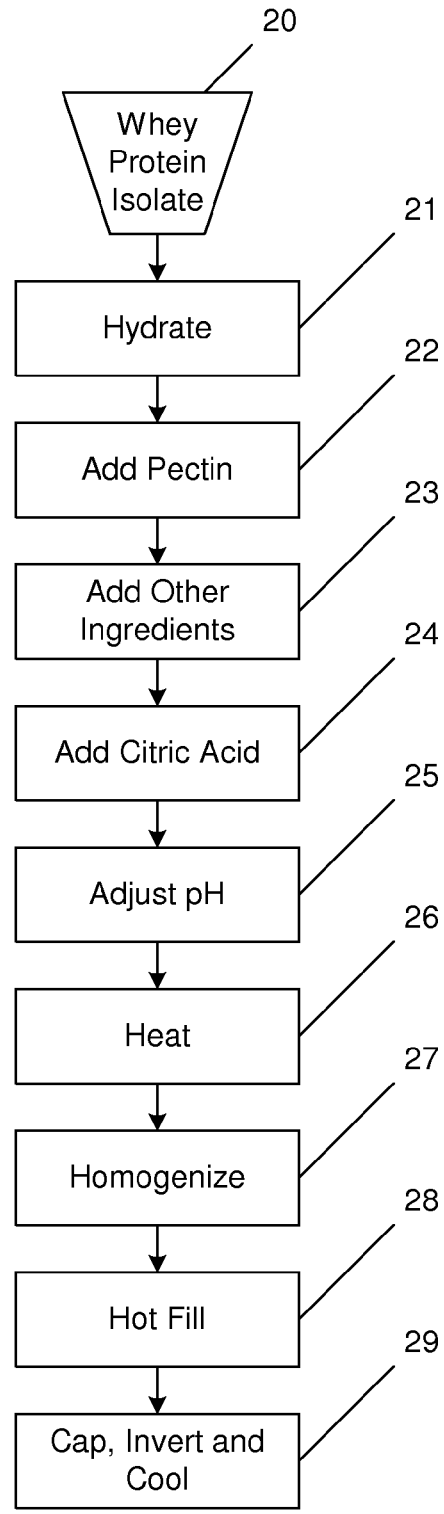
FIG. 2 illustrates a second embodiment of the present invention.

FIG. 2 and Table 3 illustrates another embodiment of the present invention, which relates to the method of preparation and the composition of a milk/juice beverage with the nutritional characteristics of a glass of milk

TABLE 3

| Component | Weight (grams) | Percent | Batch (grams) |
|---|---|---|---|
| Water | 89.25 | 89.25% | 1338.75 |
| Sugar | 3.00 | 3.00% | 45.00 |
| Whey Protein Isolate | 3.80 | 3.80% | 57.00 |
| Strawberry Juice Concentrate | 1.20 | 1.20% | 18.00 |
| Canola Oil | 1.00 | 1.00% | 15.00 |
| Pectin | 0.50 | 0.50% | 7.50 |
| Citric Acid | 0.45 | 0.45% | 6.75 |
| Milk Calcium Complex | 0.45 | 0.45% | 6.75 |
| Strawberry Flavor | 0.30 | 0.30% | 4.50 |
| Sucralose | 0.04 | 0.04% | 0.60 |
| FD&C Red 40 | 0.01 | 0.01% | 0.15 |
| TOTAL | 100.17 | 100.00% | 1000.00 |

In the embodiment disclosed above, there is only one ingredient that contains any significant amount of protein: whey protein isolate. While the other ingredients might contain trace amounts of protein, virtually all of the protein in the final beverage comes from the whey protein isolate. Thus, the whey protein isolate is the only substantial source of protein in the final beverage. In a preferred embodiment of the present invention greater than 90% of the total protein in the final product comes from whey protein isolate.

In other words, whey is the only substantial source of protein but may not be the only source of protein because some of the other ingredients may contain a small portion of protein which is provided to the final product. However, in embodiments of the present invention the reason for having the other ingredients which may contain a small amount of protein is not to provide protein content but to provide flavor, biochemical, organoleptic or other functions.

The lab procedure for preparing the beverage is described below and summarized in FIG. 2. In step 21, whey protein isolate 20 is hydrated in water using vigorous mixing. In step 22, the pectin is added with vigorous continuous mixing for approximately 3-5 minutes. In step 23, the other ingredients except for the citric acid is added and mixed thoroughly. These ingredients include sugar, strawberry juice concentrate, Canola oil, milk calcium complex, strawberry flavor, Sucralose, and FC&C Red 40 coloring. Active and/or inactive probiotics, if any, may also be added at step 23.

In step 24, the citric acid is added. In step 25, the pH of the mixture is checked and adjusted to approximately 4.3. In step 26, the mixture is headed to approximately 205° F. and held at that temperature for approximately 30 seconds. In step 27, the mixture is homogenized at 2500 PSI in a first stage followed by 500 PSI in a second stage. In step 28, the mixture is hot filled into containers at 185° F. Finally, in step 29, the containers are capped, inverted and allowed to cool.

Figure 3:
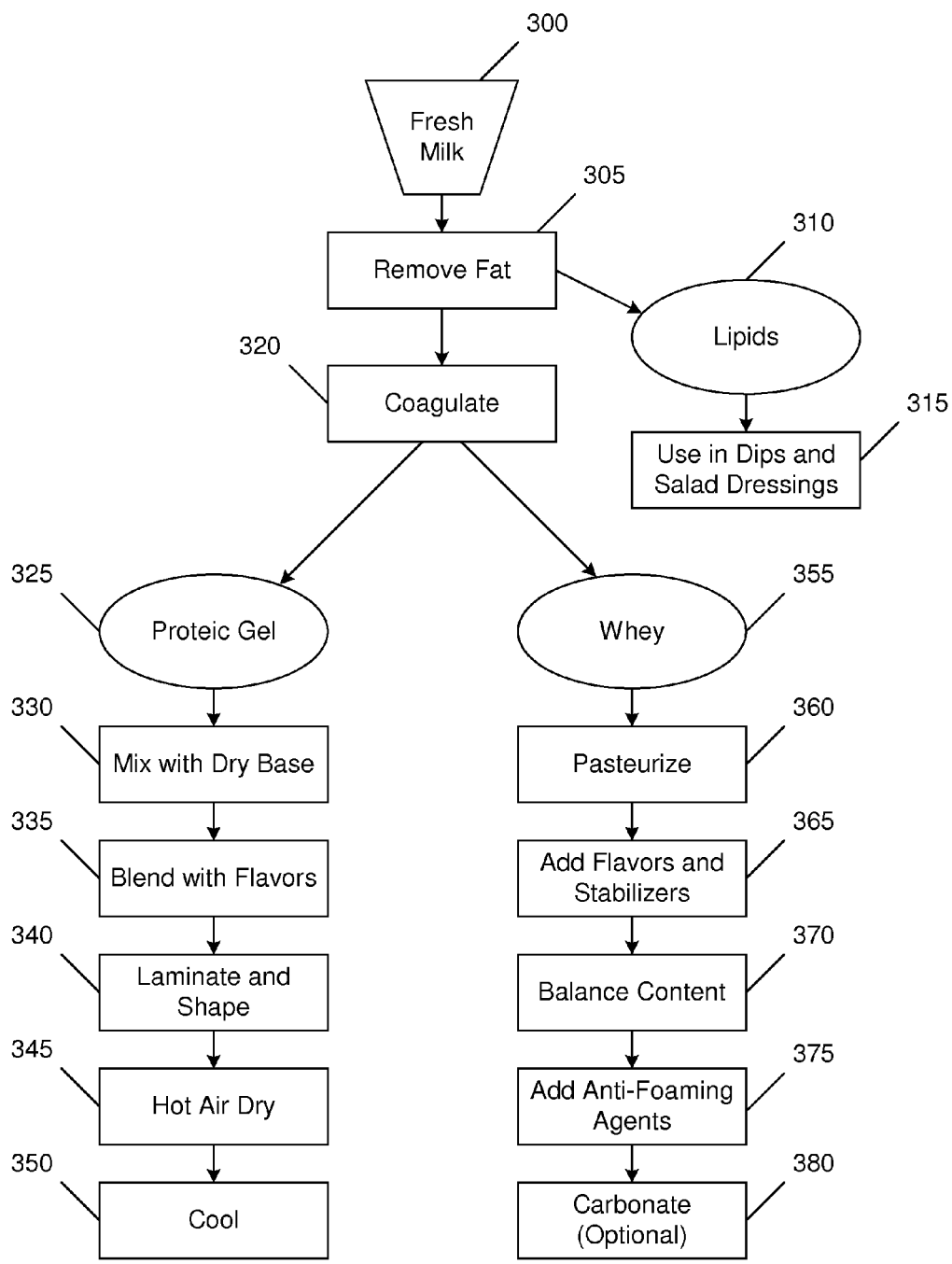
FIG. 3 illustrates another embodiment of the present invention.

FIG. 3 illustrates further embodiments of the present invention and illustrates a process of using fresh milk to make solid snacks and functional drinks Fresh milk 300 is cooled to a temperature between approximately 2 and 4 degrees Celsius until further processed. In step 305, fats are removed down to approximately 1 to 2.3% fat content. The fat (lipid) fraction 310 is saved for the production of semi-solid snacks in the form of salad dressings or dips 315.

In step 320, the casein protein of the remaining fraction is then coagulated at room temperature using a citric acid solution of approximately pH 2-4. The proteic gel 325 is next separated from the whey 355 by dispersing the milk emulsion. The whey 355 is saved for the production of functional drinks as described below.

In step 330, the proteic gel 325 is mixed with a flour dry base, which can be derived from different grains. In a preferred embodiment, the gel is mixed with the dry base to a composition of 30% protein, 40% fats and 40% carbohydrates. The relative proportions of components to obtain these percentages can be calculated upon making a qualitative analysis of the gel-dry base mixture. Preferably, these components are mixed in different proportions to obtain snacks of different consistencies, for example cookies, tortilla chips, and croutons. Once the mixture is produced with the right balance of components, sweet or savory flavors can be blended into it in step 335. The gel-dry base is subsequently laminated and shaped into the form of the particular snack in step 340. For example, the mixture is formed flat for tostadas or tortilla chips, into a cylindrical form for bars, cookies or crackers.

Once the mixture is made into its different forms these are dried in step 345 using forced hot air at temperatures of approximately 40-45° Celsius for approximately 20 to 40 minutes depending on the water content of the gel. Finally, in step 350 the different gel forms are cooled at approximately 2° Celsius using cold air. This "thermic shock" may be important for the consistency and formation of the gel and its final products. The products are now ready for packing in sealed containers where they can typically remain stored up to six months without refrigeration.

In step 360, the fractionated whey is pasteurized using standard pasteurization methodologies. In step 365 different flavors and stabilizers are added to the pasteurized whey. Additionally, in step 370 the final content of carbohydrates and protein can be varied to produce the required balance for different functional drinks. In step 375, the solution is mixed with anti-foaming agents and is subsequently carbonated in step 380 to enhance flavor and extent shelf life. At this point the solution can be bottled in aluminum cans or high density plastic bottles.

In a preferred embodiment, beverages prepared according to the methods disclosed herein result in pH in the range of 4.2 to 5.0 and preferably about 4.3. High pH beverages (i.e. beverages with pH over about 4.0) can generally not be stored for extended periods of time (e.g. greater than six months) without being refrigerated. However, the formulation and preparation methods of a preferred embodiment of the present invention achieves a stable emulsion that can handle a retorting process (e.g. pressure cooking) without breaking or denaturalizing the protein content in it. This process provides a sterilization method which gives the product the ability to have an extended shelf life without refrigeration. Thus, in a preferred embodiment, beverages will remain suitable for consumption when stored at room temperature for 30 days and preferably for more than six months. It is understood when we refer to refrigeration that the use of refrigeration is to maintain a temperature between approximately 37.5 degrees F. (3 degrees C.) and approximately 46.5 degrees F. (8 degrees C.). The products in a preferred embodiment are shelf stable in a temperature range up to approximately 95 degrees F. (35 degrees C.).

The present invention has been described above in connection with several preferred embodiments. This has been done for purposes of illustration only, and variations of the inventions will be readily apparent to those skilled in the art and also fall within the scope of the invention.

The invention claimed is:

1. A method of preparing a milk-based beverage comprising:
    hydrating whey protein isolate at approximately 4% of total weight of the beverage, in water;
    adding pectin to approximately 0.5% of total weight of the beverage;
    adding fruit juice concentrate to approximately 1% of total weight of the beverage;
    adding canola oil to approximately 1% of total weight of the beverage;
    adding sweeteners to approximately 3% of total weight of the beverage;
    adding a milk calcium complex to approximately 0.5% of total weight of the beverage;
    after said adding steps, adjusting pH to a range of approximately 4.2 to 5.0;
    heating at approximately 205° F. for approximately 30 seconds;
    homogenizing using a first stage of approximately 2500 PSI and a second stage of approximately 500 PSI;
    wherein, greater than 90% substantially all of the total protein content of said beverage comes from said whey protein isolate;
    wherein said beverage will remain safe for consumption after being stored without refrigeration for at least 30 days.

2. The method of claim 1 wherein greater than 99% of the total protein of said beverage comes from said whey protein isolate.

3. The method of claim 1 wherein said milk calcium complex comprises calcium, phosphorus, magnesium and potassium.

4. The method of claim 3 wherein milk calcium complex further comprises copper and zinc.

5. The method of claim 1 wherein said step of adjusting pH comprises adjusting pH to approximately 4.3.

6. The method of claim 1 wherein said beverage will remain safe for consumption after being stored without refrigeration for at least six months.

7. The method of claim 1 were said sweeteners are selected from the group consisting of: crystalline fructose, saccharine, aspartame, fructose polymers, glucose, glucose polymers, invert sugar, fructose syrup, glucose syrup, corn syrup, sucrose, sugar alcohols, maple syrup, honey, fruit syrups, and mixtures thereof.

8. The method of claim 1 further comprising the step of: adding a flavoring agent, before said step of adjusting pH, wherein said flavoring agent is selected from the group consisting of chocolate fudge, chocolate, vanilla, strawberry, guarana, berries, mocha, latte, peach, almond, coconut, raspberry, apple, orange, butterscotch, coffee, blueberry, papaya, orange, cherry, banana, lemon, lime, grape, cola, root beer and mixtures thereof.

9. The method of claim 1 wherein the beverage is carbonated.

10. The method of claim 1 further comprising the step of: adding active probiotics, before said step of adjusting pH.

11. The method of claim 1 further comprising the step of: adding inactive probiotics as a lyophilized powder that gets activated upon digestion, before said step of adjusting pH.

12. The method of claim 1 further comprising the step of: adding nutraceuticals, before said step of adjusting pH, said nutraceuticals selected from the group consisting of vitamins, mineral supplements, biological compounds, and pharmaceutical compounds.

13. A milk-based beverage prepared according to claim 1.

* * * * *